April 3, 1956     V. B. PHILLIPS ET AL     2,740,365
IMPLEMENT FOR DISPENSING FROZEN COMESTIBLES
Filed April 12, 1955     2 Sheets-Sheet 1
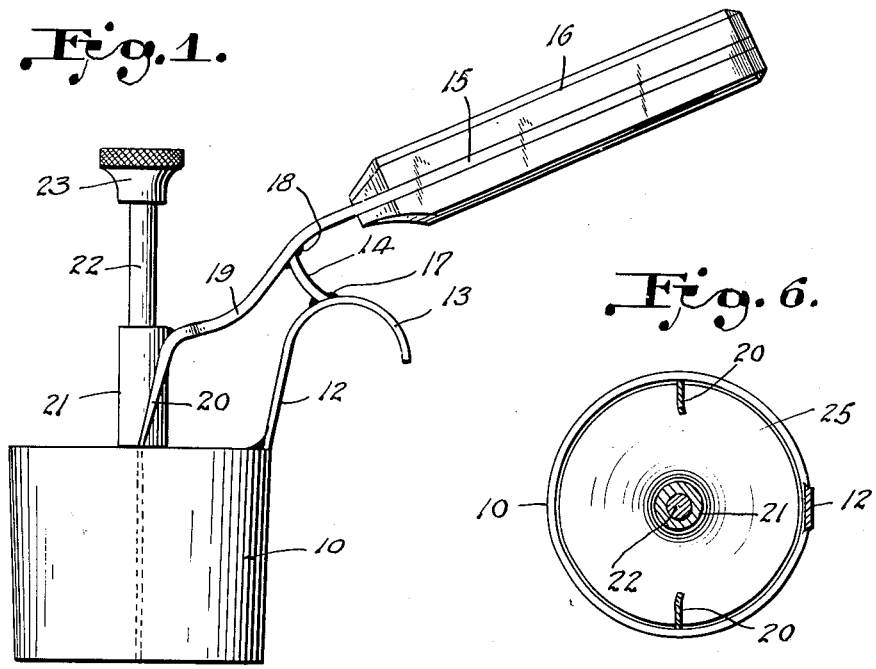
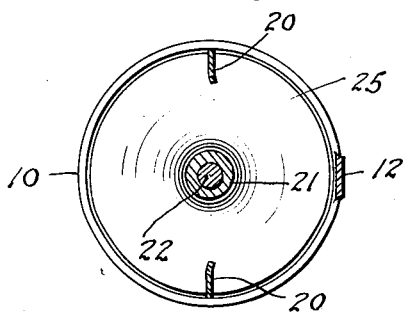
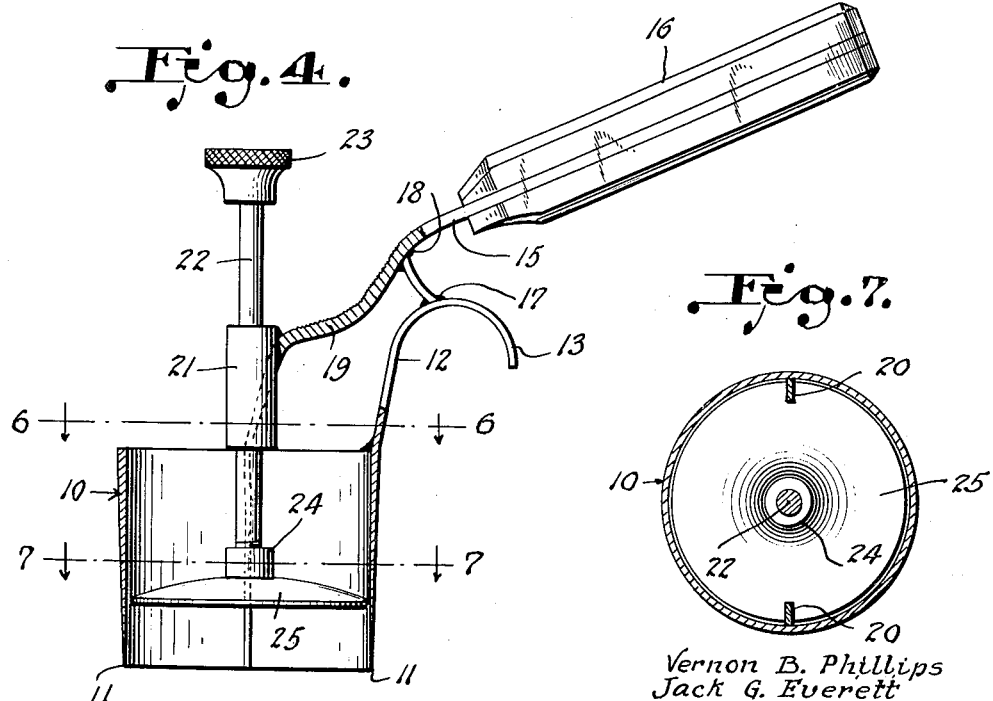
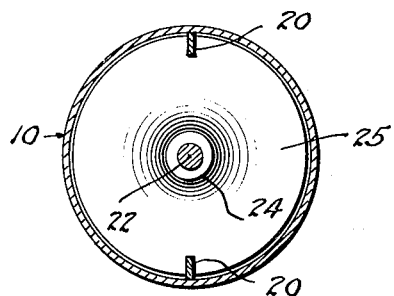
Vernon B. Phillips
Jack G. Everett
Roy P. Hoekema
INVENTORS.
BY *CA Snow & Co.*
ATTORNEYS.

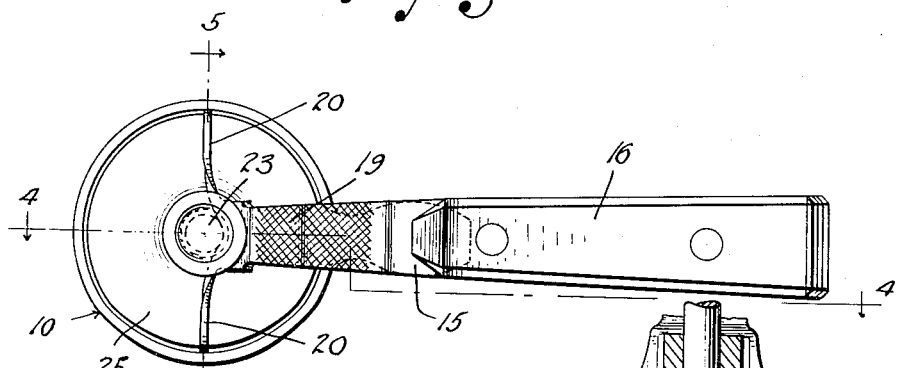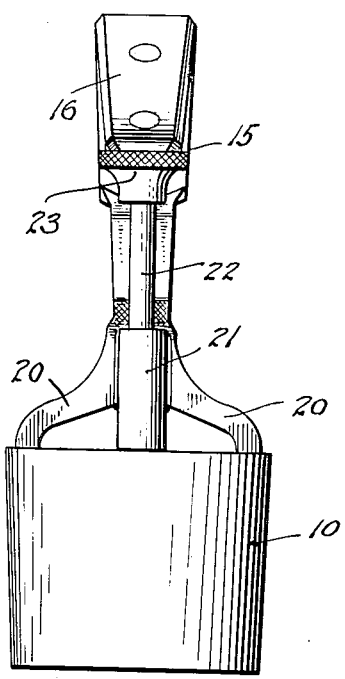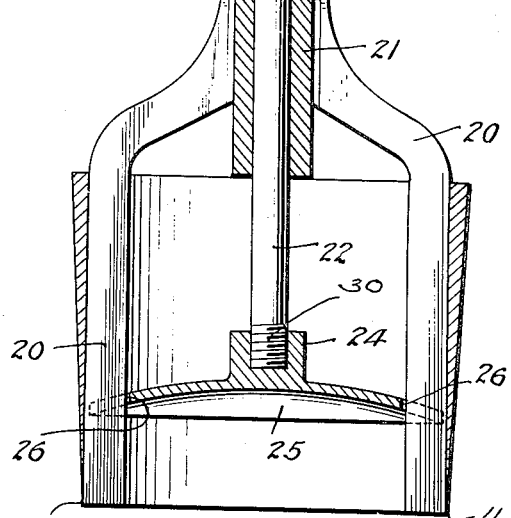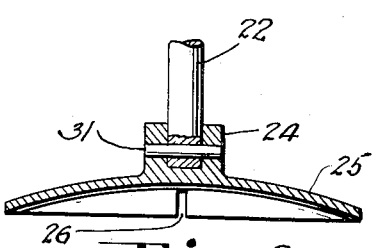

United States Patent Office 2,740,365
Patented Apr. 3, 1956

2,740,365

IMPLEMENT FOR DISPENSING FROZEN COMESTIBLES

Vernon B. Phillips, Jack G. Everett, and Roy P. Hoekema, Spokane, Wash.

Application April 12, 1955, Serial No. 500,736

1 Claim. (Cl. 107—48)

This invention relates to an implement for dispensing frozen comestibles such as ice cream or the like, and more particularly for transferring such comestibles from bulk containers into smaller packages.

A primary object of the invention is the provision of an improved implement or device of this character which will successfully receive a scoop, of any desired size, of ice cream or the like from a bulk container, retain the same within the implement, and readily and expeditiously transfer it to a suitable container.

An additional object of the invention is the provision of a device of this character which is provided with internal fins, which will serve to retain the comestible within the container until the transfer is successfully completed.

A further object of the invention is the provision of means whereby a predetermined quantity of such comestible may be picked up from a bulk container, retained in the implement, and transferred to the smaller container with a minimum of effort and difficulty.

Still another object of the invention resides in means whereby the said comestible may be readily discharged when adjacent the smaller container.

Still further objects reside in the combinations of elements, arrangements of parts, and features of construction, all as will be more fully pointed out hereinafter, and disclosed in the accompanying drawings wherein there is shown a preferred embodiment of this inventive concept.

In the drawings:

Figure 1 is a side elevational view of one form of device embodying features of the instant inventive concept.

Figure 2 is a top plan view of the device disclosed in Figure 1.

Figure 3 is an end elevational view of the device as viewed from the left in Figure 2.

Figure 4 is a sectional view taken substantially along the center line, or the line 4—4 of Figure 2 as viewed in the direction indicated by the arrows.

Figure 5 is an enlarged central sectional view of certain details of construction, taken substantially along the line 5—5 of Figure 2.

Figure 6 is a sectional view taken substantially along the line 6—6 of Figure 4 as viewed in the direction indicated by the arrows.

Figure 7 is a sectional view taken substantially along the line 7—7 of Figure 4 as viewed in the direction indicated by the arrows; and Figure 8 is a view on the scale of Figure 5 disclosing in detail an enlarged constructional element.

Similar reference characters refer to similar parts throughout the several views of the drawings.

Having reference now to the drawings in detail, there is generally indicated at 10 a tubular or cup-shaped member, which may or may not be provided at its lower edge with a cutting edge 11 as may be desired, and which is provided with an upstanding handle 12 including an arcuate finger-gripping portion 13, to which in turn is secured as by means of a binding strip 14, an elongated extending hand-gripping portion 15, which may or may not as may be desired be provided with additional padding material 16. The strip 14 is welded as at 17 and 18 to the members 13 and 15 respectively.

Outwardly extending portions of the member 15 as indicated at 19 extend downwardly into longitudinally extending fins 20 positioned within the cup 10. The oppositely disposed diverging portions of member 15 are adapted, before they separate into the fins 20, to support a cylinder 21, within which extends a movable rod 22 provided with an operating handle 23, the lower end of which is provided with a collar 24, which supports a plunger member 25 of a diameter to completely extend across the cylinder or cup 10. The member 25 is provided with oppositely disposed slot portions 26, which are adapted to receive the fins or ribs 20.

As best shown in Figure 8, the threaded end 30 of shaft or rod 22 is adapted to be held in position within the collar 24 by means of a pin or set screw 31.

From the foregoing, the operation of the device should now be readily understandable. When it is desired to remove a certain predetermined quantity of a frozen comestible such as ice cream from a bulk container, the cup 10 is pressed firmly into the bulk container, until such time as it is completely filled. A slight turn either to the right or left of the handle member 15 will then, by virtue of the fins 20, enable the comestible to be firmly held within the cylinder. It is then transferred to a smaller container, and a reverse turn to the same degree will release the comestible, whereupon pressure on the handle member 23 will force the plunger 25 downwardly to eject the comestible into a receptacle of the desired size.

From the foregoing it now should readily be seen that there is herein provided an improved implement for dispensing frozen comestibles, which accomplishes all of the objects of this invention, and others, including many advantages of great practical utility and commercial importance.

As various embodiments may be made of this inventive concept, and as various modifications may be made in the embodiments hereinbefore shown and described, it is to be understood that all matter herein is to be interpreted merely as illustrative and not in a limiting sense.

I claim:

An instrument for dispensing frozen comestibles comprising a cylindrical member open at each end, a handle disposed at an obtuse angle to the length of said member, a bifurcated extension projecting from said handle, a vertical tubular guide fixed between the bifurcations of said extension, vertical guide bars integral with said bifurcations and fixed to the inside of said member, a dome-shaped plunger slidable in said member and formed with diametrical slots in which said guide bars loosely engage, a rod fixed to said plunger and slidably engaging through said tubular guide, a knob secured to the upper end of said rod, a finger piece extending upwardly and outwardly from said member, and a brace fixed between said extension and said finger piece.

References Cited in the file of this patent

UNITED STATES PATENTS

| 1,531,179 | Daly | Mar. 24, 1925 |
| 1,708,928 | Aitken | Apr. 16, 1929 |
| 1,799,791 | Hitz | Apr. 7, 1931 |
| 2,118,976 | Larkin | May 31, 1938 |